Dec. 9, 1952      N. L. MOCHEL ET AL      2,620,554
METHOD OF MANUFACTURING TURBINE BLADES
Filed Sept. 29, 1948      3 Sheets—Sheet 1
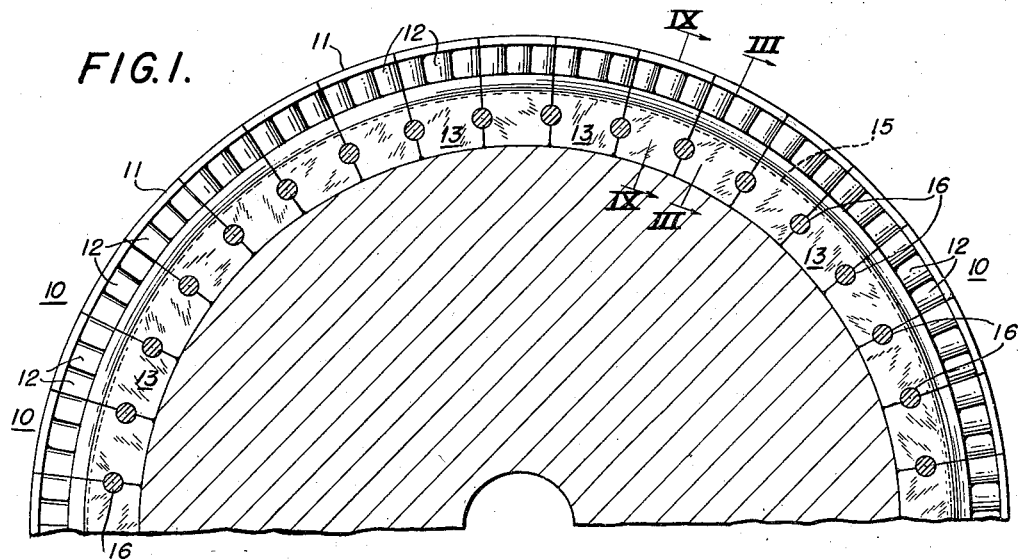
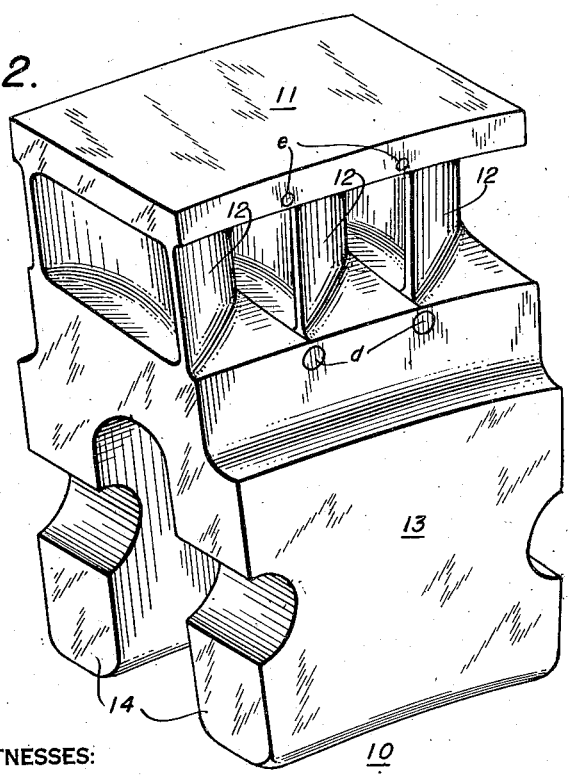
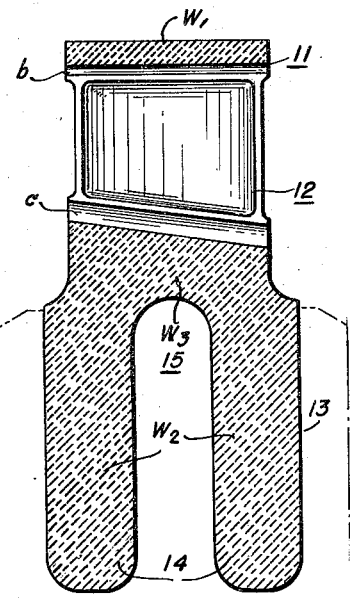
WITNESSES:
INVENTORS:—
NORMAN L. MOCHEL
JAMES A. PRATT
BY
ATTORNEY Dec. 9, 1952  N. L. MOCHEL ET AL  2,620,554
METHOD OF MANUFACTURING TURBINE BLADES
Filed Sept. 29, 1948  3 Sheets-Sheet 2
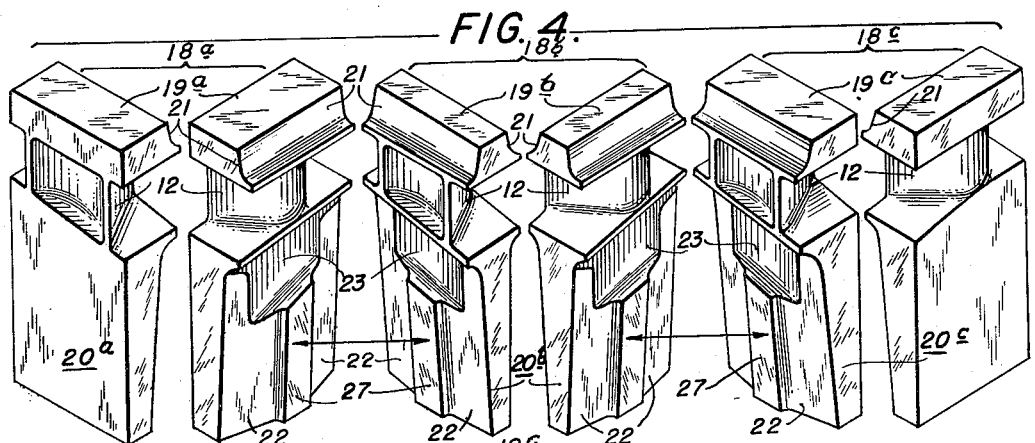
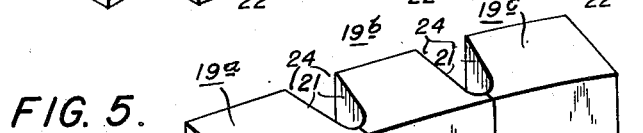
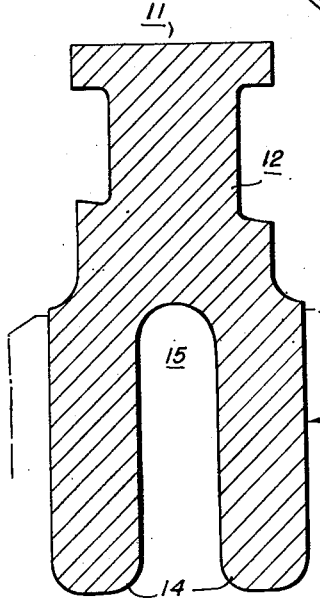
INVENTORS:—
NORMAN L. MOCHEL
JAMES A. PRATT
BY
ATTORNEY Dec. 9, 1952   N. L. MOCHEL ET AL   2,620,554
METHOD OF MANUFACTURING TURBINE BLADES
Filed Sept. 29, 1948   3 Sheets-Sheet 3
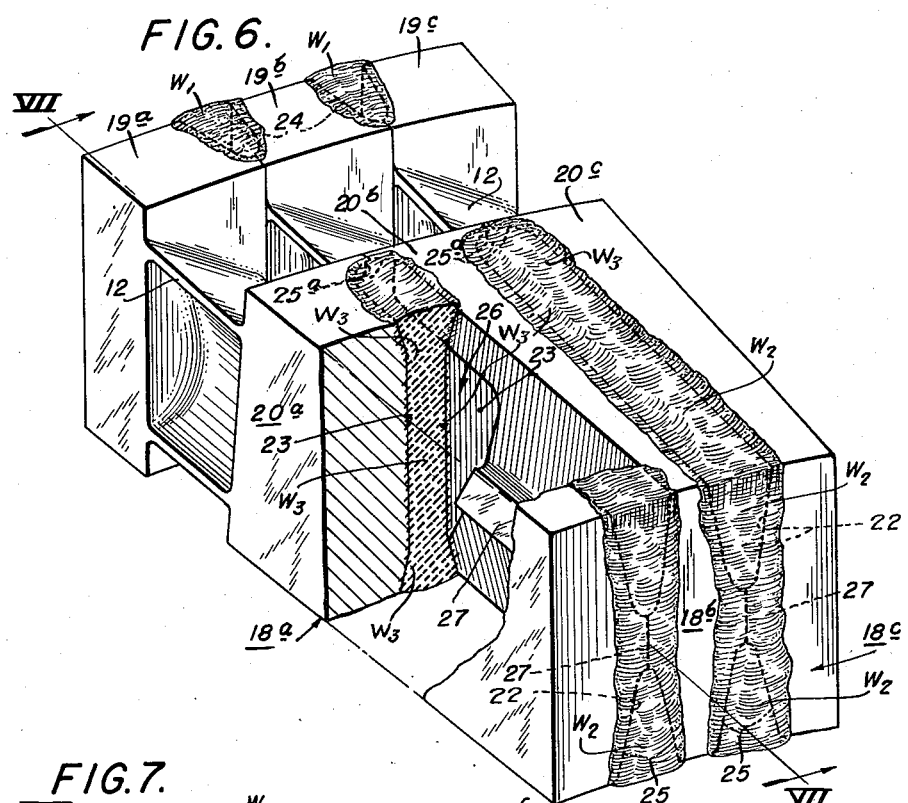
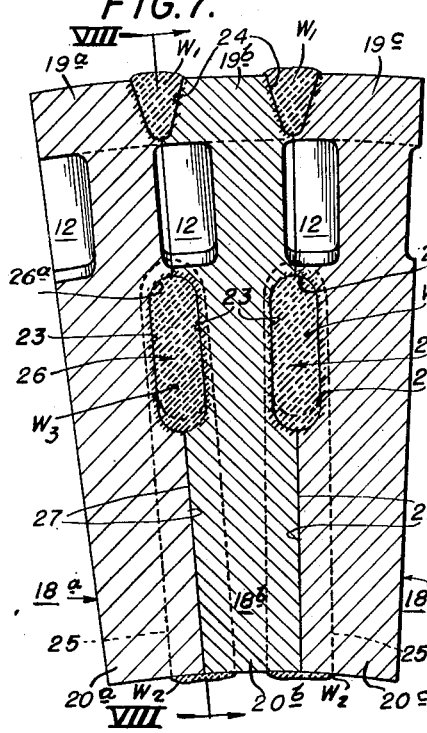
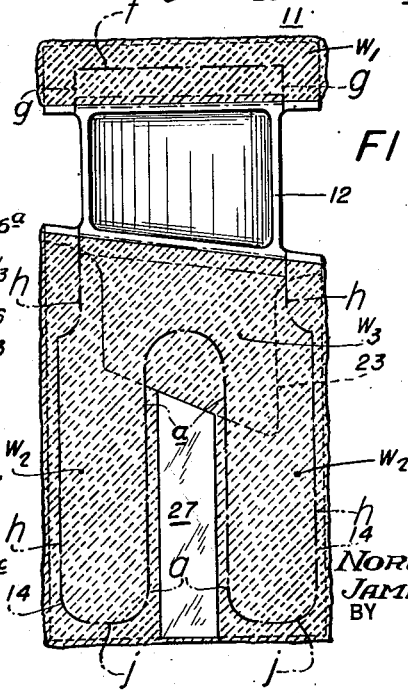
INVENTORS:-
NORMAN L. MOCHEL
JAMES A. PRATT
BY
ATTORNEY Patented Dec. 9, 1952

2,620,554

UNITED STATES PATENT OFFICE 2,620,554

METHOD OF MANUFACTURING TURBINE BLADES

Norman L. Mochel, Ridley Park, and James A. Pratt, Prospect Park, Pa., assignors to Westinghouse Electric Corporation, East Pittsburgh, Pa., a corporation of Pennsylvania Application September 29, 1948, Serial No. 51,792

2 Claims. (Cl. 29—156.8)

The invention relates to a turbine blade unit wherein a plurality of blade portions are carried by a common root construction and it has for an object to provide an improved unit of this type as well as its method of manufacture.

A further object of the invention is to provide a blade unit comprising a plurality of blade elements welded together in such manner that the poorer portions of weld metal may be removed.

Another object of the invention is to provide an improved blade unit made up of a plurality of blade elements, each having a shroud portion joined by a blade portion to a root portion, with the shroud portions welded together to form the shroud construction of the unit and the root portions welded together to form the root construction thereof.

It is common practice, with high-pressure impulse turbine blading, to have the rotating blades constituted by multiple-blade units, each of which is comprised by a plurality of blade elements joined together to give increased stiffness and a natural vibration frequency avoiding resonance difficulties in operation. Also, the patent to Kroon, No. 2,326,145, granted August 10, 1943, shows a pin fastening uniquely related to a multiple-blade unit root construction and functioning to connect the unit to a rotor flange effectively and efficiently. The present invention is concerned with a unit of this type wherein the blade element components are welded together to provide a unit of the requisite strength and stiffness and wherein fabrication to provide the root construction assures of the removal, from the portions thereof subject to the larger stresses, of the poorer portions of the connecting weld metal.

A further object of the invention is to provide a blade unit having a shroud construction joined by blade portions to a root construction including root prongs, each of which comprises spaced root parts joined by weld metal parts.

A more particular object of the invention is to provide a multiple-blade unit made up of blade elements having their root portions welded together and wherein the root construction so formed is channeled circumferentially to provide root prongs, the channeling taking place over a width of the root construction sufficient to effect removal of the poorer or bottom portions of weld metal, whereby each root prong is constituted by root portions separated by the better weld metal joining the latter.

Another object of the invention is to provide a multiple-blade unit made up of blade elements, each of which includes a shroud portion joined by a blade portion to a root portion, and wherein the abutting ends of the shroud portions are welded together and the abutting ends of the root portions are welded together; the root portions being recessed to provide grooves opening laterally of the root construction and openings connecting oppositely-extending grooves and which grooves and connecting openings bound abutting parts of the root portions, the weld metal being deposited in the grooves and connecting openings, and the root construction then being channeled laterally beyond and radially outward of the root portion abutment parts in order that the adjacent bounding portions of groove and opening weld metal may be removed along with metal of the root portions.

A more particular object of the invention is to provide a multiple-blade unit made up of blade elements, each having shroud and root portions joined by a blade portion, and wherein the unit is constructed by the following procedure: first, recessing the shroud and root portions so that, with the blade elements positioned in assembled relation, the shroud portion recesses complementally form grooves at abutting ends of the shroud portions and the root portion recesses complementally form grooves at the abutting ends of the root portions with the latter grooves opening laterally through the side faces of the root construction; second, joining the blade elements positioned in assembled relation by deposition of weld metal in the grooves; and, third, channeling the root construction to provide root prongs, said channeling taking place over a width of the root construction extending laterally beyond the root portion abutment parts between oppositely-extending grooves to provide for removal of the groove bottom portions of the weld metal along with metal of the root portions.

A further object of the invention is to add to the above procedure the steps of recessing the root portions to provide openings connecting oppositely-extending grooves so that the weld metal deposited in each pair of oppositely-extending grooves and the connecting opening bounds abutment parts of the root portions and wherein the channeling to provide the root prongs extends not only laterally beyond the abutment portions but also radially outward thereof to assure of removal of adjacent bounding portions of weld metal in the grooves and connecting openings along with metal of the root portions.

The foregoing and other objects are effected by our invention as will be apparent from the following description and claims taken in connection with the accompanying drawings, forming a part of this application, in which:

Fig. 1 is a fragmentary view of a turbine rotor showing a plurality of the improved blade units attached thereto;

Fig. 2 is a perspective of one of the improved blade units;

Fig. 3 is a sectional view taken along the line III—III of Fig. 1;

Fig. 4 is an isometric exploded view showing opposite faces of the blade elements of a unit;

Fig. 5 is an isometric view showing an assembly of blade elements of a unit before welding;

Fig. 6 is a view similar to Fig. 5 but showing the grooves and recesses filled with weld metal;

Figs. 7 and 8 are sectional views of the unit of Fig. 6, Fig. 7 being a rotational plane section indicated by the arrow of the line VII—VII of Fig. 6 and Fig. 8 being a transverse section along line VIII—VIII of Fig. 7; and Fig. 9 is a sectional view of a unit removed from rotor and taken along line IX—IX of Fig. 1.

In the drawing, there is shown a multiple-blade unit, at 10, including a shroud construction, at 11, joined by blade portions 12 to a root construction, at 13, having root prongs 14 arranged to straddle a rotor or disc flange 15 with each root construction connnected to the latter by a pair of pins 16, as more particularly disclosed and claimed in the aforesaid patent to Kroon.

Each blade unit, at 10, includes a plurality of blade elements 18a, 18b and 18c, respectively comprising shroud portions 19a, 19b and 19c joined by blade portions 12 to root portions 20a, 20b and 20c.

The blade elements 18a, 18b and 18c of each unit have the shroud portions 19a, 19b and 19c and the root portions 20a, 20b and 20c thereof recessed at 21, 22 and 23 so that, when the blade elements of a unit are positioned in assembled relation, the shroud portion recesses 21 complementally form U-shaped grooves 24 at abutting ends of the shroud portions, the root portion recesses 22 complementally form U-shaped grooves 25 at abutting ends of the root portions, and the recesses 23 complementally form openings 26 joining the grooves 25, the pairs of oppositely-extending grooves 25 and the connecting openings 26 thereof bounding middle or island abutment parts 27 of the root portions. As shown, the upper ends 25a of the grooves 25 are concave and the upper sides 26a of the openings 26 of elongated section are at the upper sides thereof, the upper ends of each pair of oppositely-extending grooves alining with the upper side of the connecting opening.

With the blade elements having the shroud and root portions thereof recessed as aforesaid, such blade elements are held together in assembled relation in any suitable manner and weld metal $W_1$ is deposited in the U-shaped grooves 24 opening radially outward of the shroud construction, $W_2$ in the U-shaped grooves 25 opening laterally outward of the root construction, and $W_3$ in the openings 26 joining the grooves 25, the weld metal $W_2$ and $W_3$ deposited in each pair of oppositely-extending U-shaped grooves 25 and in the connecting opening 26 forming a unitary weld structure bordering the abutment parts 27 of the root portions.

After welding and before machining, the blade unit may be subjected to any selected heat treatment to develop desired properties and conditions.

Subsequent to heat treatment, the root construction is channeled to provide the root prongs 14. Channeling takes place so as to extend laterally beyond the abutment parts 27 and radially outward of the latter, as indicated by dot-and-dash line $a$ in Fig. 8, whereby the adjacent bounding portions of weld metal are removed along with metal of the root portions. As the poorer portion of the weld metal is at the bottoms of the grooves and at the sides of the openings adjacent to the abutment parts, channeling in the manner stated assures of removal of the poorer portions of weld metal, whereby the channel is bounded by surfaces formed by root portions and by joining portions of superior weld metal and each root prong is similarly so formed. Also the welds $W_1$ and the common weld structures $W_2$ and $W_3$ are drilled out, as indicated by the openings $b$ and $c$ in Figs. 2 and 3, at the bottoms of the shroud construction grooves and at the bottoms of the root construction alining groove concave upper ends and opening concave upper sides, to assure of removal of the poorer portions of weld metal. Complete fusion at these locations may not always be realized, such incomplete fusion having a "crack" leading into the weld. The purpose is the same as when one drills a hole at the end of a crack to stop further progress of the latter. Small borescopes may be passed through the openings to examine for soundness of the welds and for freedom from cracks. The openings are closed by plugs $d$ and $e$ to avoid steam flow therethrough. Thus, a strong and durable construction is provided and one which avoids the likelihood of cracking starting in regions where poorer weld metal is likely to occur.

In addition to channeling after welding, as indicated by the dot-and-dash line "$a$" in Fig. 8, the welded unit is machined, as indicated by the dot-and-dash lines "$f$," "$g$," "$h$" and "$j$" in that view to provide the finished unit shown in Figs. 2 and 3, whereby it is assured that all poorer portions of the weld metal are removed.

From the foregoing, it will be apparent that we have devised a multiple-blade unit and its method of manufacture such that the unit has adequate strength and is stiff enough to avoid resonance difficulties and wherein the method involves structure which may be welded and then machined so that the weld metal portion of the unit is constituted only by the sounder deposited weld metal. With the blade elements composed of alloy steel, such as stainless steel, by the use of alloy steel weld metal of the same composition, the finished unit is an integral homogeneous structure.

While we have shown our invention in but one form, it will be obvious to those skilled in the art that it is not so limited, but is susceptible of various changes and modifications without departing from the spirit thereof.

What we claim is:

1. The method of manufacturing a turbine blade unit including a unitary shroud construction connected by a plurality of blade portions to a unitary root construction having root prongs for fastening to a rotor, said method comprising providing a plurality of blade elements each of which includes a shroud portion joined by a blade portion to a root portion; recessing the shroud and root portions to provide, with the blade elements of a blade unit positioned in assembled relation, grooves at abutting ends of the shroud portions and grooves and connecting openings at abutting ends of the root portions; said grooves of the root construction opening laterally thereof and the root portions having abutment parts, each contacting pair of which is bordered by a pair of oppositely extending grooves and the opening connecting the latter; uniting said abutting shroud portions to form the shroud construction and uniting said abutting root portions to form the root construction by the deposition of weld metal in said grooves and openings; and channeling the root construction circumferentially to provide the root prongs; said channeling extending laterally beyond the boundary of said abutment parts in order that bordering weld metal may be removed along with metal of the root portions.

2. The method as claimed in claim 1 with recessing of the root portions so that the top ends of the root construction grooves are concave and aline with concave upper sides of the openings and having openings in the weld metal at the bottoms of the shroud grooves and at the bottoms of the root construction groove concave top ends and at the bottoms of the alining concave top sides of the openings to effect removal of poorer weld metal thereat.

NORMAN L. MOCHEL.
JAMES A. PRATT.

REFERENCES CITED

The following references are of record in the file of this patent:

UNITED STATES PATENTS

| Number | Name | Date |
|---|---|---|
| 1,904,421 | Doran | Apr. 18, 1933 |
| 2,221,672 | Doran | Nov. 12, 1940 |
| 2,221,685 | Smith | Nov. 12, 1940 |
| 2,221,772 | Reynolds | Nov. 12, 1940 |
| 2,242,308 | Kroon | May 20, 1941 |
| 2,269,200 | Hillner | Jan. 6, 1942 |
| 2,315,616 | Hall | Apr. 6, 1943 |
| 2,384,919 | Huber | Sept. 18, 1945 |
| 2,392,281 | Allen | Jan. 1, 1946 |
| 2,450,493 | Strub | Oct. 5, 1948 |